July 4, 1961   F. A. HOFFMAN, JR   2,990,920
STRUCTURAL BUILDING ELEMENTS
Filed Jan. 21, 1958   2 Sheets-Sheet 1
FIG. 1.
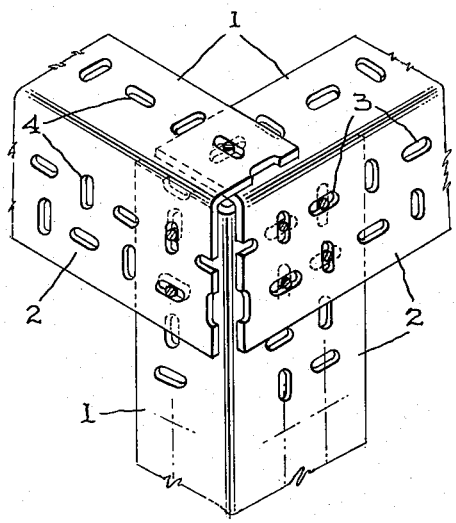
FIG. 2.
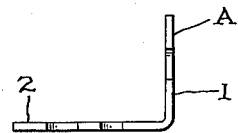
FIG. 3.    FIG. 4.
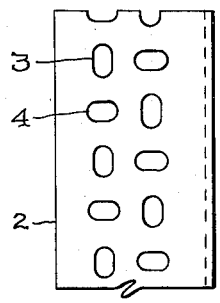 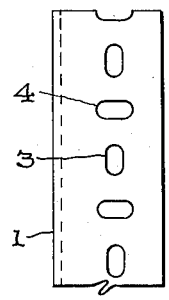
FIG. 6.
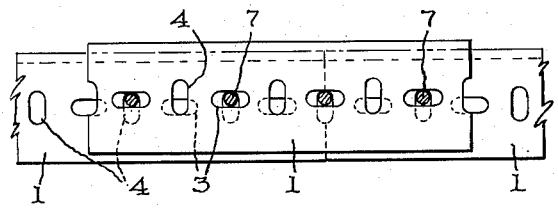
FIG. 7.
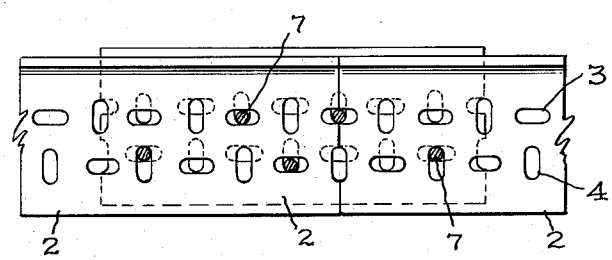
FIG. 5.
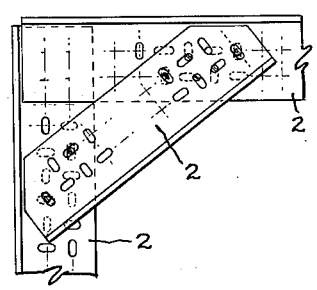
FIG. 8.
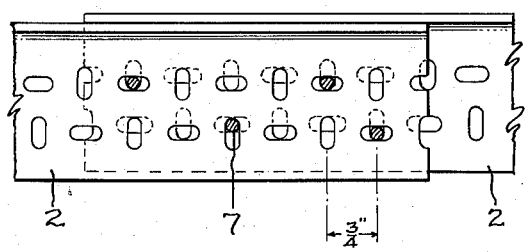
INVENTOR
FRANK A. HOFFMAN, JR.
BY *Emory L. Groff*
ATTORNEY July 4, 1961  F. A. HOFFMAN, JR  2,990,920
STRUCTURAL BUILDING ELEMENTS
Filed Jan. 21, 1958  2 Sheets-Sheet 2

INVENTOR
FRANK A. HOFFMAN, JR.
BY *Emory L. Groff*
ATTORNEY

United States Patent Office 2,990,920
Patented July 4, 1961

2,990,920
STRUCTURAL BUILDING ELEMENTS
Frank A. Hoffman, Jr., Eastlake, Ohio, assignor to Republic Steel Corporation, Cleveland, Ohio, a corporation of New Jersey
Filed Jan. 21, 1958, Ser. No. 710,231
2 Claims. (Cl. 189—34)

This invention relates to prefabricated structural building elements or shapes which are provided with mating openings to receive fasteners for connecting the elements together.

While it has been heretofore proposed to provide structural elements such as angles or plates perforated in a manner to receive connections for holding them together, nevertheless, elements now in general use have their limitations in assembly and cutting.

One of the objects of the invention is to provide angle members provided with specially formed openings arranged in more or less repetitious pattern which affords a wide latitude of flexibility in assembly.

Another object of the invention is to provide perforated structural shapes having a condensed, continuous pattern of perforations, which enables the use of relatively short or small pieces of angles of a length, for example, of approximately ¾ inch provided the shear line does not pass through the slots or openings.

A further object of the invention is to provide structural elements of the type referred to having one or more linear rows of elongated slots, each of whose axes may be disposed at right angles to an adjacent slot to provide a practically unlimited number of combinations of angular and straight assembly conditions.

A still further object of the invention is to provide structural shapes having elongated slots whose longitudinal axes are disposed transversely to the length of the flange in which the slots are formed, thereby facilitating the joining of lengths of angle by lap splicing and butt splicing.

A still further object of the invention is to provide angles of different weight, that is, light and heavy duty angles wherein the centers of the openings are so spaced and related that structural shapes of different weight and strength can be used, or in other words, the light and heavy duty angles may be used interchangeably.

A preferred and practical embodiment of the invention is shown in the accompanying drawings in which:

FIGURE 1 is a perspective view showing a typical corner connection composed of light duty angles.

FIGURE 2 is a cross sectional view of the light duty angle stock.

FIGURE 3 is a bottom plan view of the long flange of the angle shown in FIGURE 2.

FIGURE 4 is a side plan view of the short flange of the angle shown in FIGURE 2.

FIGURE 5 is a detail elevation showing how a portion of an angle may be used diagonally as a gusset brace.

FIGURE 6 is a plan view of the short flanges of the angles connected by a butt splice angle section.

FIGURE 7 is a view of the butt splice shown in FIGURE 6 illustrating the long flanges of the angles.

FIGURE 8 is a detail view illustrating a lap splice.

Similar reference characters designate corresponding parts in the several figures of the drawing.

Figure 9:
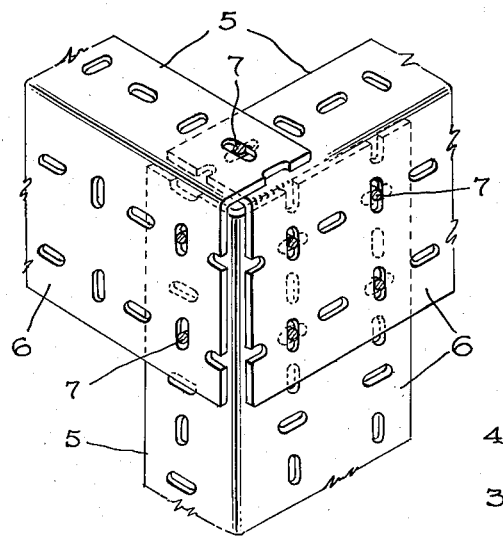
FIGURE 9 is a perspective view of heavy duty angles forming a corner connection.
Figure 10:
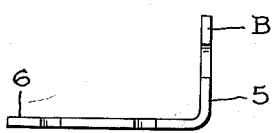
FIGURE 10 is a cross sectional view of a heavy duty angle.
Figures 11, 12:
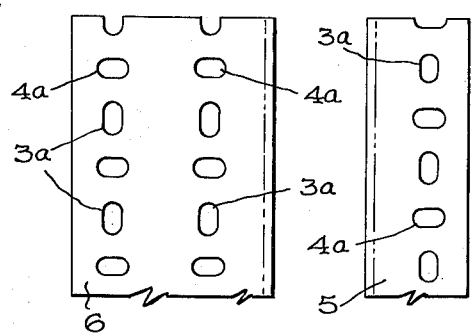
FIGURE 11 is a bottom plan view of the angle shown in FIGURE 10.
FIGURE 12 is a side plan view of the short flange of the angle shown in FIGURE 10.
Figure 13:
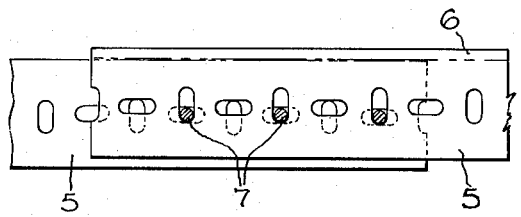
FIGURES 13 and 14 are detail views of a lap splice with the angle members in overlapping relation with the pattern of openings in each angle in staggered relationship, the views being taken at angles of 90°.

The angle members shown in FIGURES 1–8 are designated generally as A and illustrate a light duty form of angle, including a short flange 1 and a long flange 2.

The short flange 1 has arranged therein at least one linear row of elongated openings 3 and 4 spaced from each other so as to provide ¾ inch between the centers thereof. The adjacent openings have their longitudinal axes at right angles to each other. The longitudinal openings 3 are approximately $^{11}/_{32}$ inch by ½ inch in size, whereas the transverse openings 4 are approximately $^{11}/_{32}$ inch by $^{7}/_{16}$ inch in size.

The long flange 2 of the angle member is provided with at least two linear, parallel rows of openings 3 and 4 of the same dimensions and spacing as the openings formed in the short flange. The openings in the rows are arranged so as to locate a longitudinal slot 3 of one row in side by side relationship with a transverse slot 4 of the adjacent row. This location of openings is such that the longitudinal axis of each opening is at right angles to the opening beside it, as well as the opening or openings on either side of it in its respective row. The spacing between the centers of the adjacent openings is also ¾ inch, thus providing for adjustments on ¾ inch centers in either a vertical, horizontal or diagonal direction as desired.

This arrangement provides greater flexibility in assembling the angle elements and also in cutting them. Due to the angles having openings in both longitudinal and transverse directions, there is almost an unlimited number of combinations of angular and straight assembly conditions.

Figure 15:
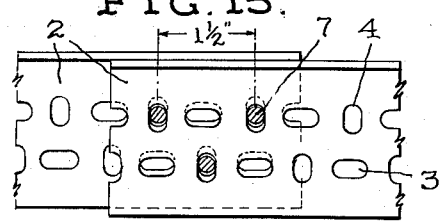
FIGURE 15 is a detail view of a lap splice with light duty angle members in overlapping relationship and the pattern of openings in each angle aligned.

Another advantage of the transverse openings 4 is that they facilitate the joining of lengths of angle by lap-splicing and butt-splicing, in which cases the angles are in nesting relationship, as illustrated in FIGURES 6, 7 and 8. The location and shape of openings 4 compensate for the thickness of angles A when so nested and permit secure bolting of the two members even if they are slightly misaligned. In each splice when the angles are nested and the openings aligned, bolts 7 may be inserted at 1½ inch intervals, as illustrated in FIGURE 15. When the angles are nested and the openings are staggered relative to each other, the bolts may be inserted at ¾ inch intervals, as illustrated in FIGURE 8.

With the versatility provided by this particular arrangement of openings, structures of various shapes, such as for example C, I, Z and T, may be constructed.

Referring to FIGURES 9–14, there is shown a heavy duty angle designated generally as B having a short flange 5 and a long flange 6, each of which is provided with openings 3a and 4a identical in size to the corresponding openings shown in FIGURES 1–8.

The primary differences between the heavy duty angle and the light duty angle are as follows:

(I) the heavy duty angle is of heavier gauge metal, that is, approximately 0.104, whereas the light duty angle is formed of 0.080 gauge metal.

(II) the long flange 6 of the heavy duty angle has its two rows of openings arranged so that their centers are 1½ inches apart transversely and ¾ inch apart longitudinally, resulting in the long flange 6 being wider than the long flange 2 of the light duty angle by at least a dimension equal to the longitudinal spacing of the openings.

(III) also, the openings 3a and 4a of long flange 6 are arranged so as to locate a transverse opening 4a directly beside a transverse opening 4a in the adjacent row and a longitudinal opening 3a directly beside a longitudinal opening 3a in said adjacent row.

Due to the light and heavy duty angles A and B having openings of the same size and shape, they can be used interchangeably as the particular construction problem requires, which results in a saving in time and cost.

The pattern of the openings permits a wide combination of bolting arrangements, which is important from the standpoint of assembly techniques and the load distribution factor, particularly concerning the bearing points on the bolts connecting the respective angles.

Figure 16:
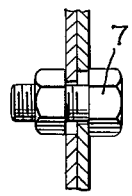
FIGURE 16 is a cross sectional view of a pair of light duty angles in assembled relation showing the bolts in bearing.
Figure 14:
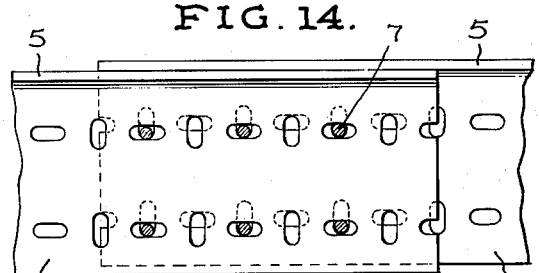
Figure 17:
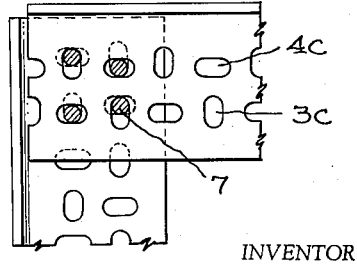
FIGURE 17 is a detail view illustrating a corner connection of two light duty angle members having all openings of identical size.

To illustrate the variety of bolting combinations possible with the present invention, the following comparison is made, the angle flanges being at 90° to each other:

|  | Bolts Possible | Bolts in Bearing (Fig. 16) | |
|---|---|---|---|
|  |  | As Detailed | As shown in Figure 17 |
| Light Angle A: |  |  |  |
| Flange 2 to 2 | 4 | 2 | 4 |
| Flange 2 to 1 | 2 | 1 | 2 |
| Flange 1 to 1 | 1 | 1 | 1 |
| Heavy Angle B: |  |  |  |
| Flange 6 to 6 | 4 | 4 | 4 |
| Flange 6 to 5 | 2 | 2 | 2 |
| Flange 5 to 5 | 1 | 1 | 1 |
| Combinations of Light Angle A and Heavy Angle B: |  |  |  |
| Flange 2 to 6 | 4 | 2 | 4 |
| Flange 2 to 5 | 2 | 1 | 2 |
| Flange 1 to 6 | 2 | 2 | 2 |
| Flange 1 to 5 | 1 | 1 | 1 |

For example, referring to FIGURES 1 and 9, a four bolt connection can be made between two long flanges; a two bolt connection can be made between one long and one short flange; and a one bolt connection can be made between two short flanges of the angles.

In the embodiments illustrated in FIGURES 1–8 and 9–16, the longitudinal openings 3, 3a have been described as being of 11/32 inch by ½ inch in size, while the transverse openings 4, 4a have been referred to as being 11/32 inch by 7/16 inch in size. In the light duty angles A shown in FIGURE 17, however, openings 3c and 4c are all of the same size.

In connecting angles having the openings formed in this manner, the patterns must be staggered to obtain the bearing arrangement shown in FIGURE 16. The advantage in having the slots all the same size is that a greater number of bolts in bearing can be attained in the light duty angle than otherwise can be accomplished with openings of different sizes.

With the heavy duty angles B the maximum number of bolts in bearing can be attained even though the openings are of different size, due to the longitudinal axes of openings 3a and 4a of adjacent rows being in the same plane.

From the foregoing, it will be seen that the structural elements of this invention provide a more flexible method of assembly than has heretofore been available. This results in a saving in both time and money in field installations, since the workman assembling the structure is not confronted with a limited number of bolt-receiving openings which require trial and error methods to correctly assemble, but on the contrary he has a virtually unlimited number of combinations of adaptable openings through which bolts can be inserted to meet various conditions of straight and angular structural assembly.

I claim:

1. An erectible structural building element having angularly disposed long and short flanges adapted to be secured by fastening in lap-spliced or butt-spliced nested non-displaceable relation to similar elements, the long flange of said element having two juxtaposed substantially parallel longitudinally disposed rows of pairs of equally spaced transverse and longitudinal elongated fastener receiving openings, immediately adjacent openings in said pairs having their longitudinal axes intersecting at right angles to each other, and the short flange having a single longitudinal row of pairs of elongated fastener receiving openings, immediately adjacent openings in said pairs also having their longitudinal axes ntersecting at right angles to each other, the center axis of each of said longitudinal openings of each flange bisecting the next adjacent transverse opening in each of said rows, whereby, when said elements are overlapped the long flange of each element has the longitudinal axes of its adjacent transverse and longitudinal openings crossed in registering relation for receiving both diagonally and directly oppositely disposed fastenings to secure the elements against lateral separation and rocking movement relative to each other.

2. An erectible structural building element according to claim 1, wherein, all of the openings in both flanges are substantially of the same size and same geometrical shape.

References Cited in the file of this patent

UNITED STATES PATENTS

| 2,746,780 | Comino | May 22, 1956 |

FOREIGN PATENTS

| 1,099,299 | France | Sept. 1, 1955 |
| 82,093 | Denmark | Oct. 8, 1956 |
| 763,111 | Great Britain | Dec. 5, 1956 |
| 763,214 | Great Britain | Dec. 12, 1956 |